United States Patent
Puri et al.

(10) Patent No.: US 9,709,014 B2
(45) Date of Patent: Jul. 18, 2017

(54) SYSTEMS AND METHODS FOR OPTIMIZATION AND CONTROL OF INTERNAL COMBUSTION ENGINE STARTING

(71) Applicant: Cummins Inc., Columbus, IN (US)

(72) Inventors: Anant Puri, Columbus, IN (US); Fan Zeng, Columbus, IN (US); Vivek Sujan, Columbus, IN (US); Edmund Hodzen, Columbus, IN (US); C. Larry Bruner, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 166 days.

(21) Appl. No.: 14/681,721

(22) Filed: Apr. 8, 2015

(65) Prior Publication Data
US 2015/0211466 A1  Jul. 30, 2015

Related U.S. Application Data

(63) Continuation of application No. PCT/US2013/066216, filed on Oct. 22, 2013, which
(Continued)

(51) Int. Cl.
*F02N 11/08* (2006.01)
*B60W 20/40* (2016.01)
(Continued)

(52) U.S. Cl.
CPC .............. *F02N 11/08* (2013.01); *B60W 20/40* (2013.01); *F02D 29/02* (2013.01); *F02D 41/062* (2013.01); *F02N 11/0844* (2013.01); *F02N 11/0851* (2013.01); *F02N 11/0814* (2013.01); *F02N 11/0822* (2013.01); *F02N 11/0825* (2013.01);
(Continued)

(58) Field of Classification Search
CPC .. F02N 11/08; F02N 11/0814; F02N 11/0822; F02N 11/0825; F02N 2200/022; F02N 2200/023; F02N 2200/04; F02N 2200/061; F02N 2200/101;
(Continued)

(56) References Cited

U.S. PATENT DOCUMENTS

| | | | |
|---|---|---|---|
| 5,088,465 | A | 2/1992 | DeBiasi et al. |
| 5,752,488 | A | 5/1998 | Hattori et al. |

(Continued)

FOREIGN PATENT DOCUMENTS

| | | |
|---|---|---|
| EP | 0990784 B1 | 4/2004 |
| WO | 2008009045 A1 | 1/2008 |

OTHER PUBLICATIONS

International Search Report and Written Opinion mailed Mar. 10, 2014 in PCT/US13/066216 filed on Oct. 22, 2015.
(Continued)

*Primary Examiner* — Erick Solis
(74) *Attorney, Agent, or Firm* — Taft Stettinius & Hollister LLP

(57) ABSTRACT

An engine starting system and technique include selecting a target engine speed profile from a plurality of engine speed profiles based on operator inputs and operating parameters of the vehicle. A feedback control strategy is used to substantially conform the engine speed with the target speed profile during starting until a target speed is reached in which fueling is initiated to start the engine.

26 Claims, 3 Drawing Sheets

Related U.S. Application Data is a continuation-in-part of application No. 13/662,869, filed on Oct. 29, 2012, now Pat. No. 9,316,195.

(51) Int. Cl.
*F02D 41/06* (2006.01)
*F02D 29/02* (2006.01)

(52) U.S. Cl.
CPC .. *F02N 2200/022* (2013.01); *F02N 2200/023* (2013.01); *F02N 2200/04* (2013.01); *F02N 2200/061* (2013.01); *F02N 2200/101* (2013.01); *F02N 2300/102* (2013.01)

(58) Field of Classification Search
CPC .......... F02N 2300/102; F02N 11/0844; F02N 11/0851; B60W 20/40; F02D 29/02; F02D 41/062
USPC ........ 701/101, 102, 106, 110, 111, 112, 113, 701/114, 115; 123/179.4
See application file for complete search history.

(56) References Cited

U.S. PATENT DOCUMENTS

| | | | |
|---|---|---|---|
| 6,138,638 A | 10/2000 | Morikawa | |
| 6,394,208 B1 | 5/2002 | Hampo et al. | |
| 6,453,863 B1 | 9/2002 | Pels et al. | |
| 6,510,370 B1 | 1/2003 | Suzuki et al. | |
| 6,560,527 B1 | 5/2003 | Russell et al. | |
| 6,688,411 B2 | 2/2004 | Boggs et al. | |
| 6,807,934 B2 | 10/2004 | Kataoka et al. | |
| 6,868,926 B2 | 3/2005 | Boggs et al. | |
| 7,377,248 B2 | 5/2008 | Hokuto | |
| 7,434,640 B2 | 10/2008 | Hughes | |
| 7,562,732 B2 | 7/2009 | Zillmer et al. | |
| 7,681,547 B2 | 3/2010 | Hughes | |
| 7,920,958 B2 | 4/2011 | Laubender | |
| 7,962,278 B1 | 6/2011 | Patterson et al. | |
| 8,037,858 B2 | 10/2011 | Seufert et al. | |
| 8,141,542 B2 | 3/2012 | Joly | |
| 8,452,469 B2 * | 5/2013 | Otokawa | B60K 6/365 701/111 |
| 8,688,299 B2 * | 4/2014 | Saito | B60K 6/48 180/65.21 |
| 9,139,197 B2 * | 9/2015 | Reed | B60W 10/02 |
| 9,316,195 B2 * | 4/2016 | Puri | F02N 11/08 |
| 9,327,717 B2 * | 5/2016 | Reed | B60W 10/196 |
| 9,340,203 B2 * | 5/2016 | Gibson | B60W 20/40 |
| 9,381,909 B2 * | 7/2016 | Banker | B60W 10/184 |
| 9,493,152 B2 * | 11/2016 | Doering | B60W 20/14 |
| 2004/0231627 A1 | 11/2004 | Kaita et al. | |
| 2007/0023004 A1 | 2/2007 | Carbonne et al. | |
| 2008/0228363 A1 * | 9/2008 | Kouno | B60K 6/48 701/54 |
| 2011/0178695 A1 | 7/2011 | Okumoto et al. | |
| 2011/0190971 A1 | 8/2011 | Severinsky et al. | |
| 2012/0024252 A1 | 2/2012 | Miller et al. | |
| 2012/0083952 A1 | 4/2012 | Smith et al. | |
| 2013/0191012 A1 * | 7/2013 | Hirotsu | B60W 10/02 701/113 |
| 2013/0296121 A1 * | 11/2013 | Gibson | F02D 41/022 477/5 |
| 2013/0297191 A1 * | 11/2013 | Gibson | F02N 11/0855 701/112 |
| 2013/0333655 A1 * | 12/2013 | Schwenke | F02N 15/00 123/179.3 |
| 2014/0116380 A1 | 5/2014 | Puri et al. | |

OTHER PUBLICATIONS

Chinese Office Action, Chinese Application No. 201380056865.3, dated Jan. 24, 2017, 9 pgs.

\* cited by examiner

SYSTEMS AND METHODS FOR OPTIMIZATION AND CONTROL OF INTERNAL COMBUSTION ENGINE STARTING

CROSS-REFERENCE TO RELATED APPLICATION

The present application is a continuation of International Patent App. No. PCT/US2013/066216 filed on Oct. 22, 2013, which claims priority to U.S. patent application Ser. No. 13/662,869 filed on Oct. 29, 2012, each of which is incorporated herein by reference in its entirety for all purposes.

BACKGROUND

Vehicles with a start-stop system for an internal combustion engine allow a started internal combustion engine to be turned off to, for example, conserve fuel, and restarted to, for example, meet driver torque demand. Since the start-up and restart conditions of the vehicle can vary widely depending on the recent and current use of the vehicle, conventional starting systems and methods can result in undesired effects, such as excessive starting duration, noise, or vibration when the engine is started or restarted. While various solutions have been proposed to address these problems, there remains a need for further technological advancements in this area.

SUMMARY

One embodiment disclosed herein involves unique systems and methods for starting an internal combustion engine under a variety of vehicle conditions while minimizing transient effects on driver comfort, vehicle operation, and operating components of the vehicle. In one application, the systems and methods are employed in a hybrid vehicle, although applications in non-hybrid vehicles are also contemplated.

In one embodiment, an engine starting system and technique for starting a vehicle is disclosed. Based on operator inputs and operating parameters of the vehicle, a starting profile is selected from one of a plurality of starting profiles stored in a memory of a controller of the vehicle. A starter motor is commanded to regulate the speed of an internal combustion engine to substantially conform to the target speed profile during starting of the engine. The instantaneous engine speed during starting is determined and compared with the target speed profile to provide feedback control of the engine speed with the starter motor so that the actual engine speed substantially conforms to the speed of the target speed profile over the starting duration. When a target speed of the target speed profile is reached, the engine is fueled to complete starting.

Further embodiments, forms, objects, features, advantages, aspects, and benefits shall become apparent from the following description and drawings.

DESCRIPTION OF THE ILLUSTRATIVE EMBODIMENTS

Figure 1:
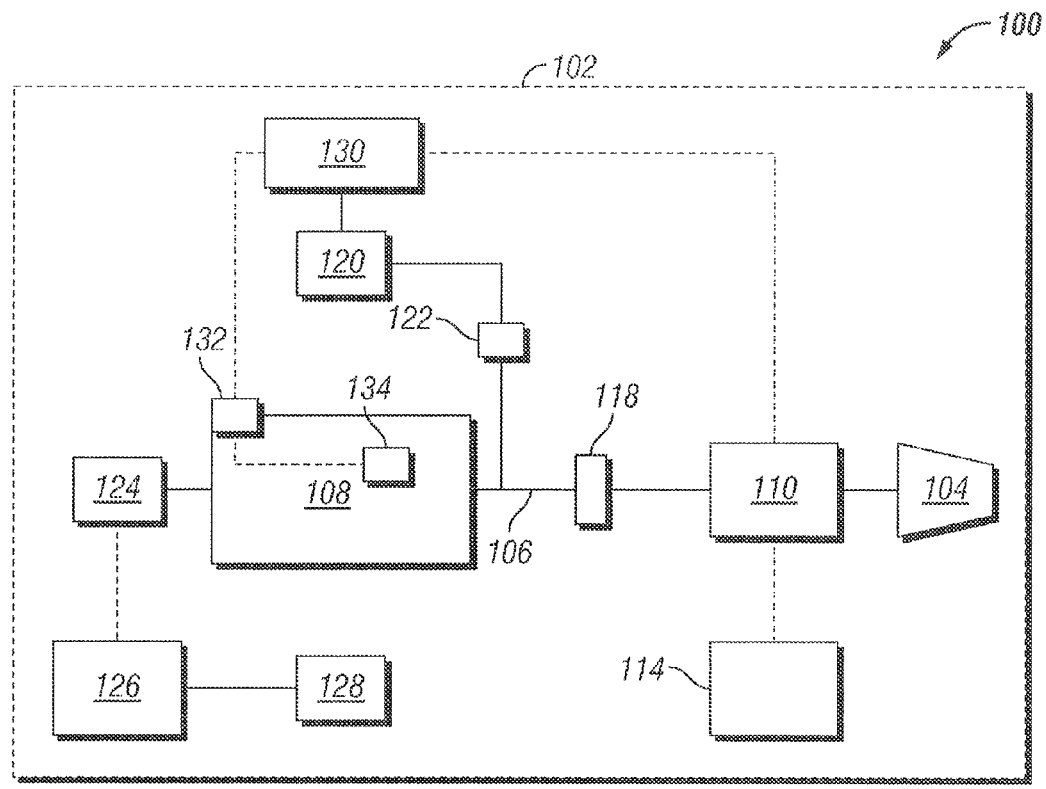
FIG. 1 is a schematic of one embodiment of a vehicle with an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an exemplary system 100 includes a vehicle 102 with a powertrain having an internal combustion engine 108 with an intake and an exhaust (not shown.) The powertrain further includes an electromechanical device such as motor-generator (M/G) 110 coupled to an output shaft 106. In the illustrated embodiment, the powertrain includes a parallel hybrid arrangement so that either or both of engine 108 and M/G 110 can provide an output torque to rotate output shaft 106. In addition, M/G 100 can serve as a starter motor during certain restart conditions to start engine 108, such as converting from an electric drive mode to an engine drive mode or hybrid drive mode. Other embodiments contemplate other hybrid arrangements, and arrangements which are not hybrid and/or lack M/G 100 for providing torque to rotate shaft 106. The engine 108 may be any type of internal combustion engine known in the art. In some applications, the internal combustion engine 108 may be a diesel engine, although gasoline engines and engines that operate with any type of fuel are contemplated. In the example of FIG. 1, the engine 108 and M/G 110 are coupled to a drive shaft through output shaft 106 and a transmission 104, which is arranged to deliver drive torque to one or more drive wheels (not shown) in response to a driver torque demand.

System 100 further includes a starter 120 coupled to output shaft 106 with a gearbox 122. Starter 120 includes a starter motor that is operable to provide a starting torque to output shaft 106 to rotate output shaft 106 and, as a result, engine 108 to a sufficient speed so that fueling of engine 108 can initiate combustion and starting of engine 108. Engine 108 is coupled to an alternator 124 which is electrically connected to a low voltage energy storage device 126. Low voltage energy storage device 126 is electrically connected to low voltage electric loads 128, which includes starter 120. Low voltage energy storage device 126 provides power to starter 120 to initiate the starting of engine 108 in at least some starting conditions. In other embodiments, starter 120 and alternator 124 are combined as a single device. Although not illustrated, DC-DC converters, power electronics, and other electrical components can be provided to establish electrical connections between low voltage energy storage device 126, alternator 124, starter 120, and other low voltage loads.

The system 100 further includes an electric generator that is selectively coupled to the drive shaft 106 and further coupled to a high voltage electrical energy storage device 114. The electric generator in FIG. 1 is included with the M/G 110 as an electric motor/generator. As used herein, M/G refers to one or more electromechanical devices that each include a motor to provide torque to the wheels or other torque to output shaft 106 to, for example, restart engine 108. M/G 110 may include an electric generator in combination therewith or an electric generator may be provided as a separate device from the motor. High voltage electrical energy storage device 114 is electrically connected to the M/G 110 to store electricity generated by the M/G 110 or, in other embodiments, is electrically connected to a generator that is a separate device. The high voltage electrical energy storage device 114 can be an electrochemical device such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any high voltage electrical energy storage device 114 is contemplated herein, including a hyper-capacitor and/or an ultra-capacitor. Although not illustrated, DC-DC converters, power electronics, and other electrical components can be provided to establish electrical connections between high voltage energy storage device 114, M/G 110, low voltage energy storage device 126, and other high voltage loads.

Engine 108 and M/G 110 are connected with a first clutch 118 that is selectively engageable to transmit drive torque produced by engine 108 to M/G 110 and/or to drive shaft 106, and to transmit torque from M/G 110 to engine 108. In certain embodiments, the system 100 includes the drive shaft 106 mechanically coupling the power train to vehicle drive wheels through transmission 104. In one embodiment, transmission 104 includes a gear box and a second clutch (not shown) that drivingly engages shaft 106 extending from M/G 110. The second clutch can be provided with, for example, an automated manual transmission (AMT). In other embodiments, transmission 104 includes a manual clutch, or is an automatic transmission and does not include a clutch. Other embodiments contemplate any suitable coupling arrangement between output shaft 106 and transmission 104 where engine 108 and/or M/G 110 are capable of providing drive torque to the wheels.

System 100 includes an engine speed sensor 134 electrically connected to an engine speed input of a controller 130. Engine speed sensor 134 is operable to sense instantaneous rotational speed of the engine 108 and produce an engine speed signal indicative of engine rotational speed. In one embodiment, sensor 134 is a Hall effect sensor operable to determine engine speed by sensing passage thereby of a number of equi-angularly spaced teeth formed on a gear or tone wheel. Alternatively, engine speed sensor 134 may be any other known sensor operable as just described including, but not limited to, a variable reluctance sensor or the like. In certain embodiments, system 100 includes an engine position sensor (not shown) that detects a current position of the crankshaft The system 100 further includes controller 130 having modules structured to functionally execute operations for managing engine start-stop and power train operation. Controller 130 is linked to M/G 110 and starter 120. Controller 130 is also linked to engine 108 through engine control module (ECM) 132. In certain embodiments, controller 130 and/or ECM 132 form a portion of a processing subsystem including one or more computing devices having memory, processing, and communication hardware. The controller 130 and/or ECM 132 may be a single device or a distributed device, and the functions of the controller 130 and ECM 132 may be performed by hardware or software in a combined controller or separate controllers. In certain embodiments, controller 130 may be a hybrid control module.

The description herein including modules emphasizes the structural independence of the aspects of controller 130, and illustrates one grouping of operations and responsibilities of the controller 130. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 6.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a runtime parameter by any means known in the art, and/or by receiving a value by which the interpreted parameter can be calculated, and/or by referencing a default value that is interpreted to be the parameter value.

Figure 2:
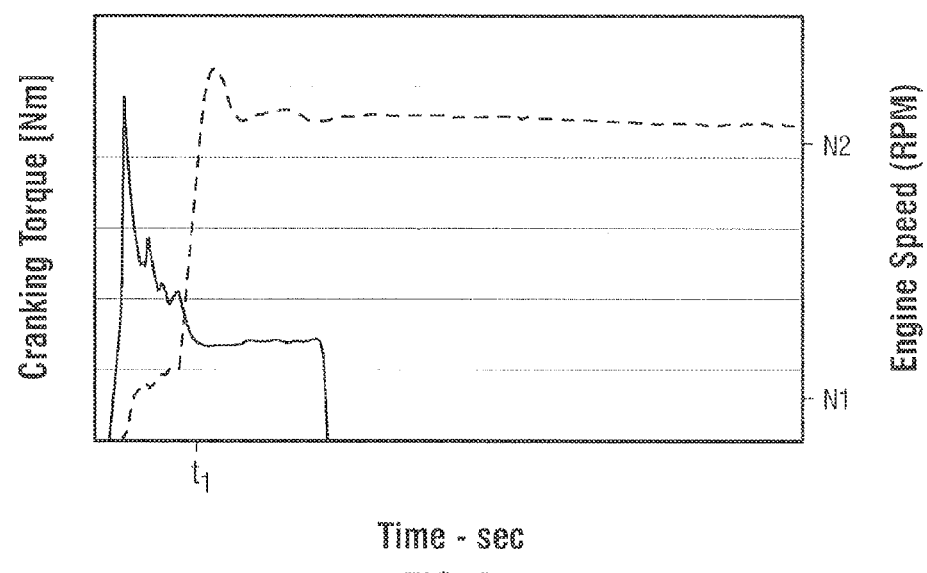
FIG. 2 is a graph of the profiles for engine speed and starting torque during a conventional engine starting process.

FIG. 2 is a graph that shows profiles over time for the starting or cranking torque and engine speed during the start of an internal combustion engine, initiated at time 0, using a conventional starter motor and starting profile. Typical starter motors are controlled in an on/off manner. The starter motor, with gear reduction to the output shaft, spins or rotates the output shaft of the engine until its speed reaches a predetermined threshold, such as around 100-200 RPM. At this speed, fuel injection results in combustion to start the engine.

As shown in FIG. 2, the starter motor drives the speed of the engine above a first threshold N1 and engine fueling starts in a first time period t1. The torque output produced by additional fueling increases the speed of the engine to an idle speed threshold N2. This conventional starting system is satisfactory for starting an engine when initiated by the operator through the ignition under many conditions. In one specific embodiment, first threshold N1 is about 100 RPM and time t1 is about 1 second, and second threshold N2 is about 750 RPM. However, other conditions may exist during operation of system 100 in which conventional engine starting produces less satisfactory results. For example, system 100 includes multiple prime movers, such as engine 108 and M/G 110, that may be repeatedly stopped and started during a drive cycle to conserve fuel and increase efficiency. In system 100, engine 108 may need to be able to be started at a higher speed over a shorter duration of time than what is obtained through the conventional starting profile of FIG. 2 to accommodate a change from an electric drive mode to a hybrid drive mode. In one specific example, engine 108 may need to be started at a starting speed of near or above threshold N2 and in a time period that is substantially less than t1, to avoid excessive noise, vibration, and other adverse conditions during the starting process. In one specific embodiment, substantially less than t1 means at least 25% less than t1.

Systems and methods are disclosed herein that optimize and control the starting of engine 108 to meet varying performance indexes while staying within operating constraints to minimize adverse conditions associated with the engine start. The systems and methods include optimizing the engine speed profile to satisfy defined performance indexes based on current operating parameters and operator inputs, and controlling the engine speed using a feedback approach to follow the optimized speed profile during starting of the engine.

Figure 3:
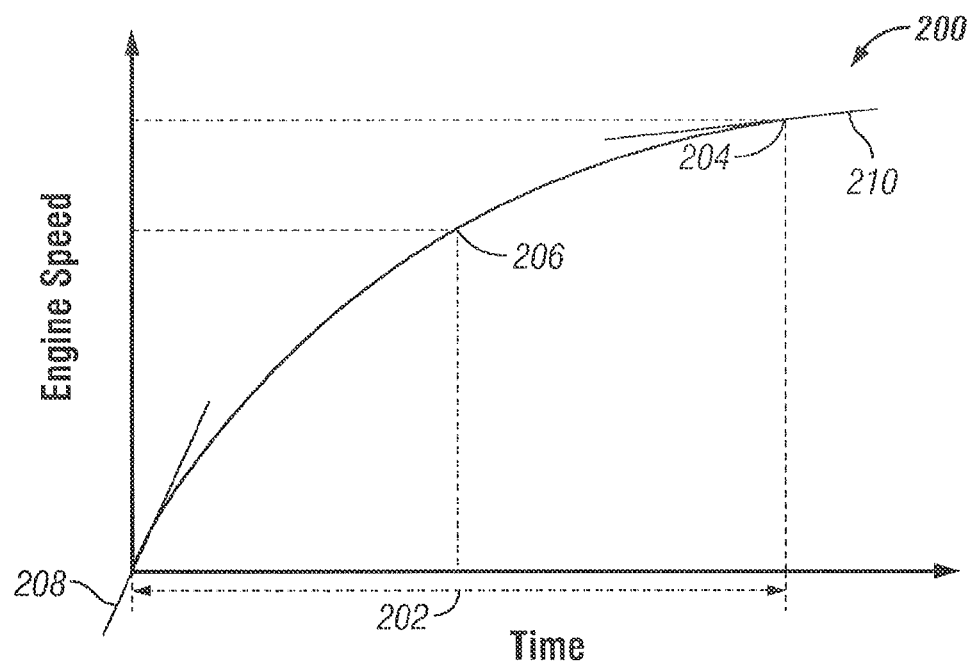
FIG. 3 is a graph showing characteristics of a target speed profile for starting of the internal combustion engine of FIG. 1.
Figure 4:
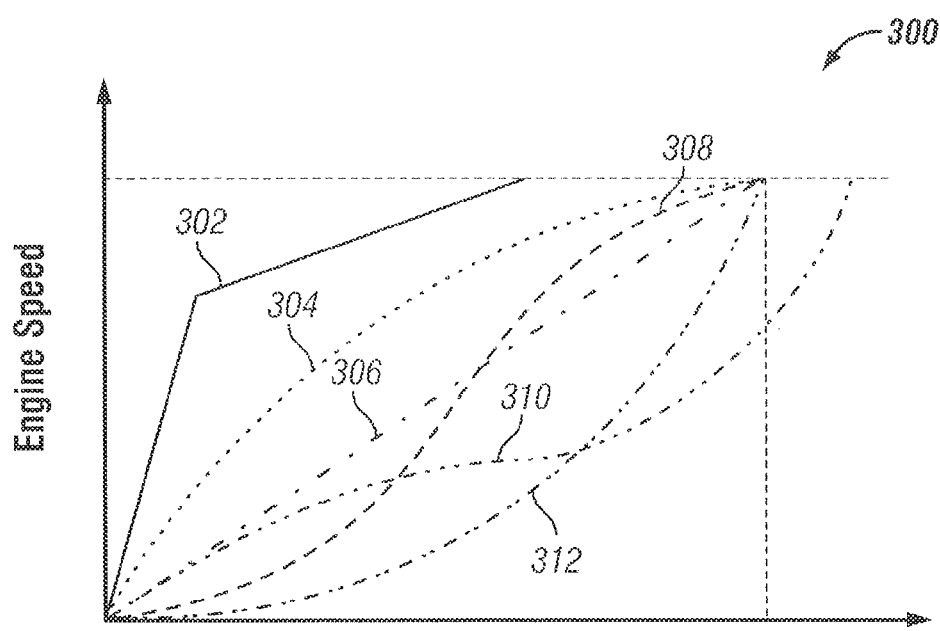
FIG. 4 is a graph showing several target speed profiles for starting of the internal combustion engine of FIG. 1 with differing characteristics.

Referring to FIG. 3, an engine speed profile during starting of engine 108 can be characterized by a set of starting parameters. By way of illustration and not limitation, FIG. 3 illustrates an engine speed profile having starting parameters 200 that include a starting duration 202, a target starting speed 204, a mid-way speed 206, an entry acceleration 208, and an exit acceleration 210. By varying these parameters, among others, various speed profiles 300 can be generated, such as those illustrated in FIG. 4, including speed profiles 302, 304, 306, 308, 310 and 312. The speed profiles, collectively and individually referred to as speed profiles 300, can be optimized for various starting conditions. For example, a first speed profile can be optimized for a cold engine starting condition by using a high starting torque and long starting duration, second and third speed profiles can be optimized for low charge conditions of energy storage devices 114, 126 by utilizing low starting torques and longer starting durations, a fourth speed profile can be optimized for a quick start condition that provides reduced noise and vibration, and a fifth speed profile can be optimized to minimize starting failure probability. Other speed profiles are also contemplated.

Figure 5:
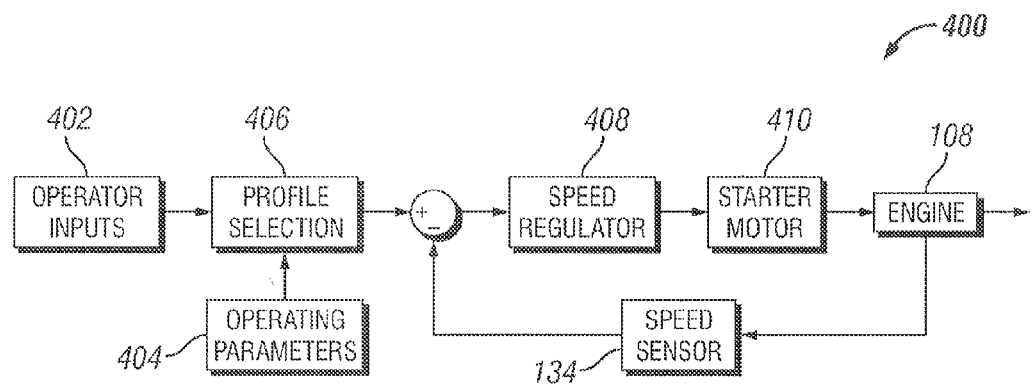
FIG. 5 is a schematic of a control system architecture for starting the internal combustion engine of the vehicle of FIG. 1.

FIG. 5 is a schematic of feedback control architecture 400 for regulating engine speed during a starting duration to follow a desired speed profile 300. Feedback control architecture 400 includes an operator input 402 and an operating parameters input 404. Inputs 402, 404 are evaluated for a profile selection 406 that provides the target engine speed profile 300 for the starting of engine 108 with a starter motor 410 selected from one of M/G 110 and starter 120. The target speed profile selection 406 is made from the plurality of target speed profiles 300 stored in the controller of the vehicle. The selected target speed profile 300 optimizes any one or combination of performance indexes based on inputs 402, 404. The performance indexes include, for example, starting failure probability, starting duration, peak torque required to start the engine, and/or noise and vibration during the starting process, among others. The target speed profile 300 can also be selected subject to various constraints, including, for example, starter motor peak torque, starter motor peak power, energy storage device discharge current, available state of charge of the energy storage device, and/or engine temperature, among others. In certain embodiments, the target speed profile 300 can also be selected subject to a required number of engine crank revolutions, which is discussed in further detail in the description of FIG. 6.

The profile selection 406 of the target speed profile 300 that optimizes one or more of the above performance indexes and satisfies the performance constraints may counteract another performance index. For example, reducing the starting duration may increase the required torque from the starter motor 410, potentially increasing noise and/or vibration. Starter motor 410 is selected, for example, from one of M/G 110 and starter 120 depending on the selected speed profile 300, operator inputs 402 and/or operating parameters 404. Therefore, profile selection 406 is configured to meet fundamental requirements of the starting process, such as starting duration or target starting speed, and maintain a balance between the other performance indexes and constraints. The selected target speed profile 300 could vary for different operator inputs 402 and/or operating parameters 404. Examples of operating inputs and parameters influencing profile selection 406 include an engine restart upon driver demand from an accelerator; a cold temperature of engine 108; a first start of engine 108; a state of one or both of M/G 110 and starter 120; or an engine restart due to low state of charge of an energy storage device 114, 126. Thus, the target speed profile 300 selected by controller 130 can be switched in real time during starting and during subsequent restarts among a set of pre-optimized speed profiles 300 stored in a memory of controller 130 to adapt to different and/or changing operator inputs 402 and operating parameters 404.

Once profile selection 406 is complete, a feedback control approach using, for example, controller 130 as a speed regulator 408 is employed. Controller 130 provides a control command to starter motor 410 to drive output shaft 106 to follow the target speed profile 300. Speed sensor 134 continually or periodically senses the instantaneous rotating speed of engine 108 over the starting duration and provides the information to controller 130. Controller 130 compares the actual engine speed provided by speed sensor 134 with the engine speed required by the selected speed profile 300 at that moment and provides a control command to starter motor 410 to increase, reduce or maintain the rotation of output shaft 106 to substantially conform to the target speed profile 300 over the starting duration.

Figure 6:
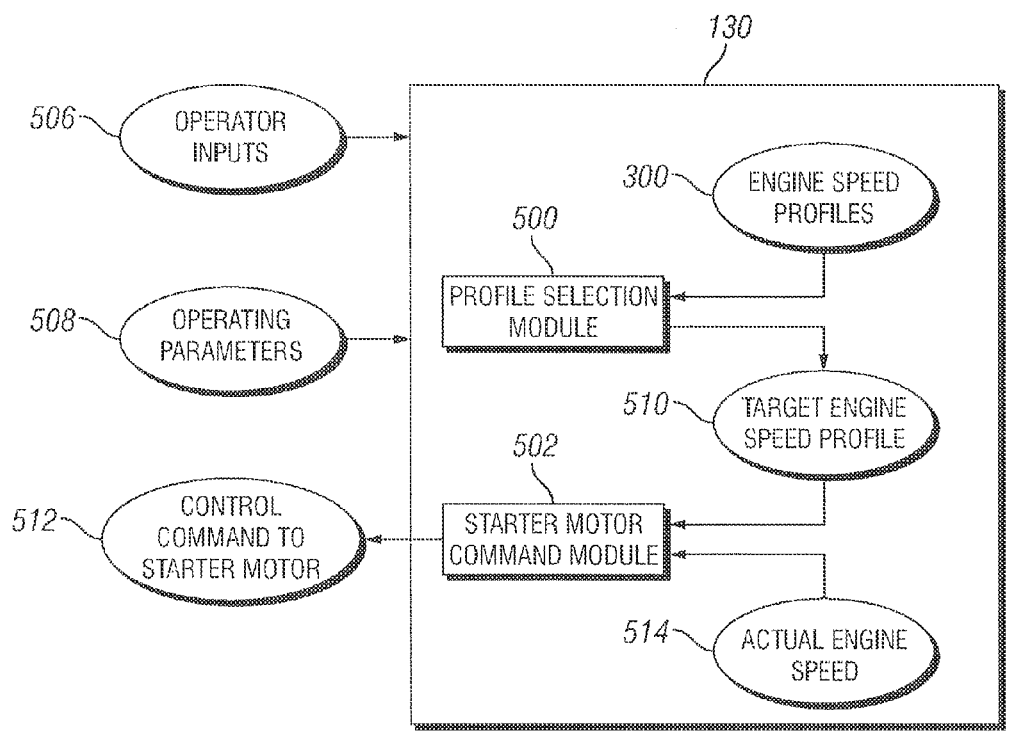
FIG. 6 is a schematic view of a controller that functionally executes certain operations for starting the internal combustion engine of the vehicle of FIG. 1.

FIG. 6 is a schematic view of a part of a controller apparatus such as controller 130 for starting engine 108. The exemplary controller 130 includes a profile selection module 500 and a starter motor command module 502. Profile selection module 500 is structured to select one of a plurality of engine speed profiles 300 stored in a memory of controller 130, or otherwise maintained, in accordance with operator inputs 506 and operating parameters 508. Operator inputs 506 may include, for example, an accelerator position, an ignition switch position, a request for engine starting, a torque demand from the powertrain, and others. Operator inputs 506 may also include output torque required to operate one or more accessories of the vehicle, such as compressors, pumps, air conditioning systems, heating systems, compressed air systems, pulley systems, and hydraulic systems, for example. Operating parameters 508 may include any one or combination of engine temperature, state-of-charge of one or more of the energy storage devices, an engine on/off state, engine speed, M/G speed, M/G on/off state, and others. Operating parameters 508 may also include operational goals that include any one or combination of the following: achieving desired fuel efficiency, maintaining a state-of-charge of the energy storage device(s), achieving a desired emissions level, operating components at highest efficiencies, recapturing energy, and maintaining an operational integrity of the components. Profile selection module 500 selects a target engine speed profile 510 based on the operator input 506 and operating parameters 508 and provides the same to starter motor command module 502.

In certain embodiments, profile selection module 500 selects a target engine speed profile 510 based on which of the engine speed profiles 300 will result in a required number of engine crank revolutions. For example, two (2) engine crank revolutions, or 1 cam revolution, may be required for the starter motor 410 to rotate the output shaft 106 to a sufficient speed so that engine 108 is synchronized with a fueling command. Other crank revolution amounts are also contemplated, Thus, even if a speed profile 300 may satisfy the operator input 506 and operating parameters 508, it is not selected if it does not meet the required number of engine crank revolutions since the starter motor 410 may be unable to rotate the output shaft 106 to a sufficient speed so that engine 108 starts when a fueling command is provided. For example, the starting torque and power required to make the engine speed follow engine speed profile 306 may be less than the starting power and starting torque to follow engine speed profile 304. Since engine speed profile 306 will not meet the required number of engine crank revolutions it is not selected, whereas engine speed profile 304 is selected if it meets the required number of engine crank resolutions. As a result, the engine speed profile is selected that satisfies the minimum number of required full crank revolutions while providing the desired starting torque and power to ensure that engine 108 will start when fuelling is initiated.

In certain embodiments, the profile selection module 500 determines which of the speed profiles 300 will meet achieve two (2) engine crank revolutions utilizing the equation:

$$\text{Total Engine Crank Revolutions} = \frac{\theta_{total}}{2\pi} \qquad \text{Equation 1}$$

wherein $\theta_{total}$ is the engine crank angle determined utilizing the equation:

$$\theta_{total} = \int_{t_i}^{t_f} f(t) \cdot dt \qquad \text{Equation 2}$$

wherein $t_f$ is a total engine cranking process time, $t_i$ is an engine cranking starting time, and f(t) represents an engine speed profile as a function of time in radians per second; and wherein at least one embodiment of determining the engine speed profile as a function of time can be completed utilizing the polynomial equation:

$$\dot{\theta} = f(t) = \ldots + a*t^4 + b*t^3 + c*t^2 + d*t + e \qquad \text{Equation 3}$$

wherein each of a, b, c, d, and e is a coefficient of Equation 3 to fit an existing speed profile or a new peed profile at a time t and the equation is an $n^{th}$-order equation where n is greater than or equal to 1. It is contemplated that the variables used in Equation 1, Equation 2, and Equation 3 may be measured, calculated, and/or modeled. In still other embodiments, other equations can be used to formulate f(t) such as logarithmic, exponential, and other functions.

Starter motor command module 502 determines or calculates control command 512 to starter motor 410 to control the speed of engine 108 to substantially conform the speed of engine 108 to the target engine speed profile 510. Control command 512 can be a speed, torque, power or other command to starter motor 410. Engine speed sensor 134 continually or periodically provides instantaneous actual engine speed readings 514 to starter motor command module 502 for feedback control. The instantaneous engine speed reading is compared with the engine speed of the target engine speed profile 510, and a new control command 512 is determined to substantially conform the actual engine speed to the target engine speed profile 510. When starting engine 108 from 0 speed, control command 512 operates starter motor 410 to rotate output shaft 106 to a sufficient speed so that engine 108 starts when a fueling command is provided. Specific embodiments of the controller 130 may omit certain modules or have additional modules, as will be understood by the description herein and the claims following.

The exemplary procedures disclosed herein provide for starting engine 108 to substantially conform to a target speed profile selected from a plurality of speed profiles based on operator inputs and operating parameters. The operational descriptions herein provide illustrative embodiments of performing procedures for starting engine 108. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable, non-transitory medium, where the computer program product comprises instructions causing the computer to execute one or more of the operations, or to issue commands to other devices to execute one or more of the operations.

It is understood that, during transient events or at certain operating conditions, the engine 108, M/G 110, starter 120, clutch 118, and/or the gearbox 122 and other electrical and mechanical energy devices and the mechanical systems may be unable to achieve the instantaneous response required to change operating conditions at precise intervals and/or at specific speeds, torques and timing for engine 108 to precisely follow the target speed profile. In certain embodiments, operations of the controller 130 smooth the torque response or limit the torque outputs of engine 108 and starter motor 410 and engagement of clutch 118 and gearbox 122 to physically realizable limits, such that the conditions which define the actual engine speed in relation to the target engine speed profile may be exceeded or not met over a brief period of operation. Nevertheless, these operations are understood to be operations to regulate actual engine speed to substantially conform to a target engine speed profile.

As is evident from the figures and text presented above, a variety of aspects of the engine starting techniques for a vehicle are contemplated. In one aspect a method comprises: maintaining a plurality of engine speed profiles for starting an internal combustion engine of a vehicle; selecting a target engine speed profile from the plurality of engine speed profiles based on operator inputs from an operator of the vehicle and operating parameters of the vehicle; driving the internal combustion engine with a starter motor in response to selecting the target engine speed profile; determining an instantaneous engine speed during the starting duration; regulating the speed of the internal combustion engine during the starting duration in response to the instantaneous engine speed to substantially conform the speed of the internal combustion engine with the target speed profile; and starting the internal combustion engine when the speed of the internal combustion engine reaches or is within a region around a target speed of the target speed profile.

In one embodiment of the method, the starter motor is at least one of a motor-generator and a starter. In another embodiment of the method, the operator inputs include an accelerator pedal position and the operating parameters include at least one of an engine temperature, a state of charge of an energy storage device, a torque demand, and a state of at least one starter motor. In a further embodiment of the method, each of the plurality of engine speed profiles includes a plurality of operating characteristics including at least two or more of a starting duration, an entry acceleration, a mid-way speed, an exit acceleration, and the target speed. At least one of the operating characteristics differs for each of the engine speed profiles. In one embodiment, the target speed is at or above a first threshold N1, and in another embodiment the target speed is at or above a second threshold N2 that is greater than N1.

In another embodiment of the method, selecting the target speed profile includes determining at least one of a starting failure probability, a starting duration, a peak torque required to start the engine, and noise and vibration of the engine during starting. In a further embodiment of the method, selecting the target engine speed profile further includes determining an engine crank revolution count for the target speed profile. In one refinement of this embodiment, the engine crank revolution count is determined in response to an engine crank angle, a total engine cranking process time, and an engine cranking starting time. In still a further embodiment of the method, selecting the target speed profile includes determining at least one of a peak torque of the starter motor, a peak power of the starter motor, a maximum discharge current of an energy storage device connected to the starter motor, and an available state-of-charge of the energy storage device.

According to another aspect, a method comprises operating a vehicle with a powertrain to satisfy a driver torque demand. While operating the vehicle the method includes selecting a target engine speed profile from a plurality of engine speed profiles stored in a controller of the vehicle. Selecting the target speed profile includes interpreting operator inputs and operating parameters of the vehicle with the controller to determine the target speed profile. The method also includes providing a control command to a starter motor to rotate the internal combustion engine in accordance with the target speed profile over a starting duration; determining the instantaneous engine speed during the starting duration; modifying the control command during the starting duration to regulate the speed of the internal combustion engine to substantially conform with the target speed profile based on the instantaneous speed determination; and fueling the internal combustion engine when an actual speed of the internal combustion engine is within a region around a target speed of the target speed profile. As used herein, the region includes a range of actual speeds below and above the target speed that account for where and which compression stroke occurs nearest to the target speed so that fuelling is optimized relative thereto. In one embodiment of the method, selecting the target engine speed profile further includes determining an engine crank condition for the target speed profile meets a minimum number of engine crank revolutions before fuelling. In one refinement of this embodiment, the engine crank condition is determined by a crank revolution function in response to engine crank angle, total engine cranking process time, and engine cranking starting time; and the engine crank angle is determined by a net total crank revolutions over of time.

In another embodiment of the method, the starter motor is an electromechanical device of the power train; the electromechanical device is selectively engageable to the internal combustion engine with a friction clutch; and the electromechanical device is operable to satisfy the driver torque demand in an electric drive mode. In another embodiment of the method, the starter motor is a starter connected to the powertrain with a gearbox. In yet another embodiment of the method, the starter motor is selected from a starter connected to the powertrain with a gearbox and an electromechanical device selectively coupled to the internal combustion engine with a friction clutch.

According to another aspect, a system includes a powertrain including an internal combustion engine having an output shaft and at least one starter motor operable to rotate the output shaft of the internal combustion during starting of the internal combustion engine. The system also includes a controller in communication with the internal combustion engine and the starter motor configured to initiate starting of the internal combustion engine. The controller includes an engine speed profile selection module configured to determine a target speed profile for starting the internal combustion engine. The engine speed profile selection module is further configured interpret operator inputs and operating parameters of the internal combustion engine to select the target speed profile from a plurality of engine speed profiles stored in a memory of the controller. The controller also includes a starter motor command module configured to determine a control command for the starter motor to rotate the output shaft of the internal combustion engine in response to the selection of the engine speed profile. The starter motor command module is configured to regulate the control command over a starting duration in response to an instantaneous engine speed determination to substantially conform the speed of the internal combustion engine with the target speed profile during the starting duration.

In one embodiment of the system, the at least one starter motor includes an electromechanical device selectively coupled to output shaft of the internal combustion engine with a friction clutch, where the internal combustion engine and the electromechanical device are each operable to satisfy an operator torque demand. In refinement of this embodiment, the at least one starter motor further includes a starter connected to the output shaft of the internal combustion engine with a gearbox. In another refinement of this embodiment, the electromechanical device is a motor-generator.

In another embodiment of the system, the at least one starter motor includes a starter connected to the output shaft of the internal combustion engine with a gearbox. In a further embodiment of the system, each of the plurality of engine speed profiles includes a plurality of operating characteristics including at least two or more of a starting duration, an entry acceleration, a mid-way speed, an exit acceleration, and the target speed. At least one of the operating characteristics differs for each of the engine speed profiles. In yet another embodiment of the system, the controller is configured to select the target speed profile by interpreting at least one of a starting failure probability, a starting duration, a peak torque required to start the engine, noise and vibration of the engine during starting, a peak torque of the starter motor, a peak power of the starter motor, a maximum discharge current of an energy storage device connected to the starter motor, and an available state-of-charge of the energy storage device.

In a further embodiment of the system, the engine speed profile selection module is further configured to determine a number of total engine crank revolutions for the speed profiles utilizing the equation:

$$\text{Total Engine Crank Revolutions} = \frac{\theta_{total}}{2\pi}$$

wherein $\theta_{total}$ is the engine crank angle determined utilizing the equation:

$$\theta_{total} = \int_{t_i}^{t_f} f(t) \cdot dt$$

wherein $t_f$ is a total engine cranking process time for the speed profile, $t_i$ is an engine cranking starting time, and $f(t)$ represents an engine speed profile as a function of time in radians per second; and wherein one embodiment determining the engine speed profile as a function of time can be done utilizing the equation:

$$\dot{\theta}=f(t)=\ldots+a*t^4+b*t^3+c*t^2+d*t+e$$

wherein each of a, b, c, d, and e is a coefficient to fit and existing speed profile or to generate a new speed profile at a time t and the equation is an $n^{th}$-order equation where n is greater than or equal to 1.

In a further embodiment, selecting the target engine speed profile further includes determining an engine crank revolution count. In one refinement of this embodiment, the engine crank revolution count is determined as a function of an engine crank angle, total engine cranking process time, and engine cranking starting time.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   maintaining a plurality of engine speed profiles for starting an internal combustion engine of a vehicle;
   selecting a target engine speed profile from the plurality of engine speed profiles based on operator inputs from an operator of the vehicle and operating parameters of the vehicle, wherein selecting the target engine speed profile further includes determining an engine crank revolution count provided by the target engine speed profile satisfies a minimum crank revolution count before starting the engine;
   driving the internal combustion engine with a starter motor in response to selecting the target engine speed profile;
   determining an instantaneous engine speed during the starting duration;
   regulating the speed of the internal combustion engine during the starting duration in response to the instantaneous engine speed to substantially conform the speed of the internal combustion engine with the target speed profile; and
   starting the internal combustion engine in response to the speed of the internal combustion engine reaching a target speed of the target speed profile.

2. The method of claim 1, wherein the starter motor is at least one of a motor-generator and a starter.

3. The method of claim 1, wherein the operator inputs include an accelerator pedal position.

4. The method of claim 1, wherein the operating parameters include at least one of an engine temperature, a state of charge of an energy storage device, a torque demand, and a state of at least one starter motor.

5. The method of claim 1, wherein:
   each of the plurality of engine speed profiles includes a plurality of operating characteristics including at least two or more of a starting duration, an entry acceleration, a mid-way speed, an exit acceleration, and the target speed; and
   at least one of the operating characteristics differs for each of the engine speed profiles.

6. The method of claim 1, wherein the target speed includes a first threshold.

7. The method of claim 6, wherein the target speed includes a second threshold that is greater than the first threshold.

8. The method of claim 1, wherein selecting the target speed profile includes determining at least one of a starting failure probability, a starting duration, a peak torque required to start the engine, and noise and vibration of the engine during starting.

9. The method of claim 1, wherein the engine crank revolution count is determined in response to an engine crank angle, a total engine cranking process time, and an engine cranking starting time.

10. The method of claim 1, wherein selecting the target speed profile includes determining at least one of a peak torque of the starter motor, a peak power of the starter motor, a maximum discharge current of an energy storage device connected to the starter motor, and an available state-of-charge of the energy storage device.

11. A method, comprising:
    operating a vehicle with a powertrain to satisfy a driver torque demand, and while operating the vehicle:
        selecting a target engine speed profile from a plurality of engine speed profiles stored in a controller of the vehicle, wherein selecting the target speed profile includes interpreting operator inputs and operating parameters of the vehicle with the controller to determine the target speed profile, wherein selecting the target engine speed profile further includes determining an engine crank condition of the target speed profile satisfies a minimum number of engine crank revolutions before fueling the internal combustion engine;
        providing a control command to a starter motor to drive the internal combustion engine according to the target speed profile over a starting duration;
        determining the instantaneous engine speed during the starting duration;
        modifying the control command during the starting duration, to regulate the speed of the internal combustion engine to substantially conform with the target speed profile based on the instantaneous speed determination; and
        fueling the internal combustion engine when an actual speed of the internal combustion engine is within a region around a first threshold target speed of the target speed profile.

12. The method of claim 11, wherein:
    the engine crank condition is determined by a crank revolution function in response to engine crank angle, total engine cranking process time, and engine cranking starting time; and
    wherein the engine crank angle is determined by a net total crank revolutions determined as a function of time.

13. The method of claim 11, wherein:
    the starter motor is an electromechanical device of the power train;
    the electromechanical device is selectively engageable to the internal combustion engine with a friction clutch; and the electromechanical device is operable to satisfy the driver torque demand in an electric drive mode.

14. The method of claim 11, wherein the starter motor is a starter connected to the powertrain with a gearbox.

15. The method of claim 11, wherein the starter motor is selected from a starter connected to the powertrain with a gearbox and an electromechanical device selectively coupled to the internal combustion engine with a friction clutch.

16. A system, comprising:
a powertrain including an internal combustion engine having an output shaft;
at least one starter motor operable to rotate the output shaft of the internal combustion during starting of the internal combustion engine;
a controller in communication with the internal combustion engine and the starter motor configured to initiate starting of the internal combustion engine, the controller comprising:
an engine speed profile selection module configured to determine a target speed profile for starting the internal combustion engine, wherein the engine speed profile selection module is further configured interpret operator inputs and operating parameters of the internal combustion engine to select the target speed profile from a plurality of engine speed profiles stored in a memory of the controller, wherein the engine speed profile selection module is further configured to determine an engine crank revolution count in response to an engine crank angle, a total engine cranking process time, and an engine cranking starting time and to determine the engine crank revolution count of the target engine speed profile satisfies a minimum crank revolution count for starting the engine; and
a starter motor command module configured to determine a control command for the starter motor to rotate the output shaft of the internal combustion engine in response to the selected target speed profile, wherein the starter motor command module is configured to regulate the control command over a starting duration in response to an instantaneous engine speed determination to substantially conform the speed of the internal combustion engine with the target speed profile during the starting duration.

17. The system of claim 16, wherein the at least one starter motor includes an electromechanical device selectively coupled to output shaft of the internal combustion engine with a friction clutch, wherein the internal combustion engine and the electromechanical device are each operable to satisfy an operator torque demand.

18. The system of claim 17, wherein the at least one starter motor includes a starter connected to the output shaft of the internal combustion engine with a gearbox.

19. The system of claim 18, wherein the electromechanical device is a motor-generator.

20. The system of claim 16, wherein the at least one starter motor includes a starter connected to the output shaft of the internal combustion engine with a gearbox.

21. The system of claim 16, wherein:
each of the plurality of engine speed profiles includes a plurality of operating characteristics including at least two or more of a starting duration, an entry acceleration, a mid-way speed, an exit acceleration, and the target speed; and
at least one of the operating characteristics differs for each of the engine speed profiles.

22. The system of claim 16, wherein the controller is configured to select the target speed profile by interpreting at least one of a starting failure probability, a starting duration, a peak torque required to start the engine, noise and vibration of the engine during starting, a peak torque of the starter motor, a peak power of the starter motor, a maximum discharge current of an energy storage device connected to the starter motor, and an available state-of-charge of the energy storage device.

23. The system of claim 16, wherein the engine speed profile selection module is further configured to determine the number of total engine crank revolutions utilizing the equation:

$$\text{Total Engine Crank Revolutions} = \frac{\theta_{total}}{2\pi}$$

wherein $\theta_{total}$ is the engine crank angle determined utilizing the equation:

$$\theta_{total} = \int_{t_i}^{t_f} f(t) \cdot dt$$

wherein $t_f$ is a total engine cranking process time, $t_i$ is an engine cranking starting time, and f(t) is an engine speed profile as a function of time in radians per second.

24. The system of claim 23, wherein the engine speed profile is determined utilizing the equation:

$$\dot{\theta} = f(t) = \ldots + a*t^4 + b*t^3 + c*t^2 + d*t + e$$

wherein a, b, c, d, and e are coefficients to fit an engine speed profile at a time t and the equation is an $n^{th}$-order equation where n is greater than or equal to 1.

25. The method of claim 1, wherein the engine speed profile selection module is further configured to determine the number of total engine crank revolutions utilizing the equation:

$$\text{Total Engine Crank Revolutions} = \frac{\theta_{total}}{2\pi}$$

wherein $\theta_{total}$ is the engine crank angle determined utilizing the equation:

$$\theta_{total} = \int_{t_i}^{t_f} f(t) \cdot dt$$

wherein $t_f$ is a total engine cranking process time, $t_i$ is an engine cranking starting time, and f(t) is an engine speed profile as a function of time in radians per second.

26. The method of claim 11, wherein the engine speed profile selection module is further configured to determine the number of total engine crank revolutions utilizing the equation:

$$\text{Total Engine Crank Revolutions} = \frac{\theta_{total}}{2\pi}$$

wherein $\theta_{total}$ is the engine crank angle determined utilizing the equation:

$$\theta_{total} = \int_{t_i}^{t_f} f(t) \cdot dt$$

wherein $t_f$ is a total engine cranking process time, $t_i$ is an engine cranking starting time, and $f(t)$ is an engine speed profile as a function of time in radians per second.

* * * * *